(12) United States Patent
White et al.

(10) Patent No.: US 9,032,866 B2
(45) Date of Patent: May 19, 2015

(54) DRIP FILTER COFFEE MAKER

(75) Inventors: Gerard Andrew White, Alexandria (AU); Daniel Serra, Victoria (AU)

(73) Assignee: Breville Pty Limited, Alexandria, New South Wales (AU)

( * ) Notice: Subject to any disclaimer, the term of this patent is extended or adjusted under 35 U.S.C. 154(b) by 30 days.

(21) Appl. No.: 13/415,822

(22) Filed: Mar. 8, 2012

(65) Prior Publication Data

US 2012/0199008 A1    Aug. 9, 2012

Related U.S. Application Data

(62) Division of application No. 12/282,649, filed on Sep. 12, 2008, now abandoned.

(30) Foreign Application Priority Data

Mar. 23, 2006  (AU) ................ 2006901499

(51) Int. Cl.
| | |
|---|---|
| *A47J 31/00* | (2006.01) |
| *A47J 31/10* | (2006.01) |
| *A47J 31/04* | (2006.01) |
| *A47J 31/42* | (2006.01) |
| *A47J 31/56* | (2006.01) |
| *G01F 23/34* | (2006.01) |
| *G01F 23/48* | (2006.01) |
| *G01F 23/50* | (2006.01) |
| *G01F 23/68* | (2006.01) |
| *G01F 23/74* | (2006.01) |

(52) U.S. Cl.
CPC .............. *A47J 31/10* (2013.01); *A47J 31/04* (2013.01); *A47J 31/42* (2013.01); *A47J 31/56* (2013.01); *G01F 23/34* (2013.01); *G01F 23/48* (2013.01); *G01F 23/50* (2013.01); *G01F 23/68* (2013.01); *G01F 23/74* (2013.01)

(58) Field of Classification Search
CPC ............ A47J 31/42; A47J 31/56; A47J 31/52
USPC ............... 99/286, 287, 304, 306, 307, 289 R
See application file for complete search history.

(56) References Cited

U.S. PATENT DOCUMENTS

| | | | | |
|---|---|---|---|---|
| 4,913,037 | A * | 4/1990 | Newnan ...................... | 99/286 |
| 5,463,932 | A * | 11/1995 | Olson ......................... | 99/280 |
| 5,939,853 | A * | 8/1999 | Masauji et al. ............. | 318/685 |
| 7,201,098 | B2 * | 4/2007 | Wang .......................... | 99/286 |

* cited by examiner

*Primary Examiner* — Reginald L Alexander
(74) *Attorney, Agent, or Firm* — Molins and Co. Pty. Ltd.

(57) ABSTRACT

Disclosed in this specification is a drip filter coffee maker that includes features to improve the taste of the brewed coffee and to enhance to ease of use. In one embodiment, an integral plate burr grinder sends coffee ground down a coffee chute that feeds the filter cone. A chute door at the end of the coffee chute prevents vapors or condensation from entering the coffee chute. In another embodiment, the eject tray that carries the filter cone may be coupled with a dampened spring biasing mechanism which moderates the eject motion. Further, a pivot float may be provided within the carafe so that the user may read the carafe fill level easily.

10 Claims, 17 Drawing Sheets

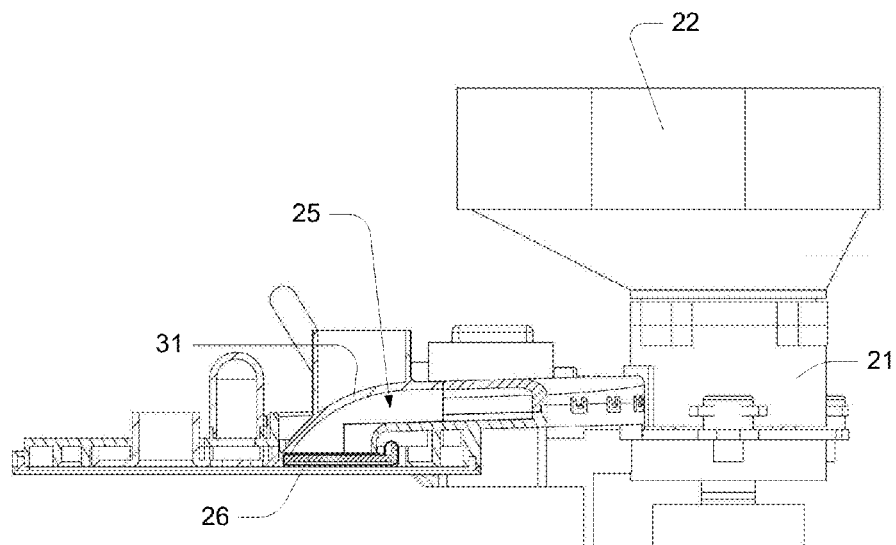
FIG. 3
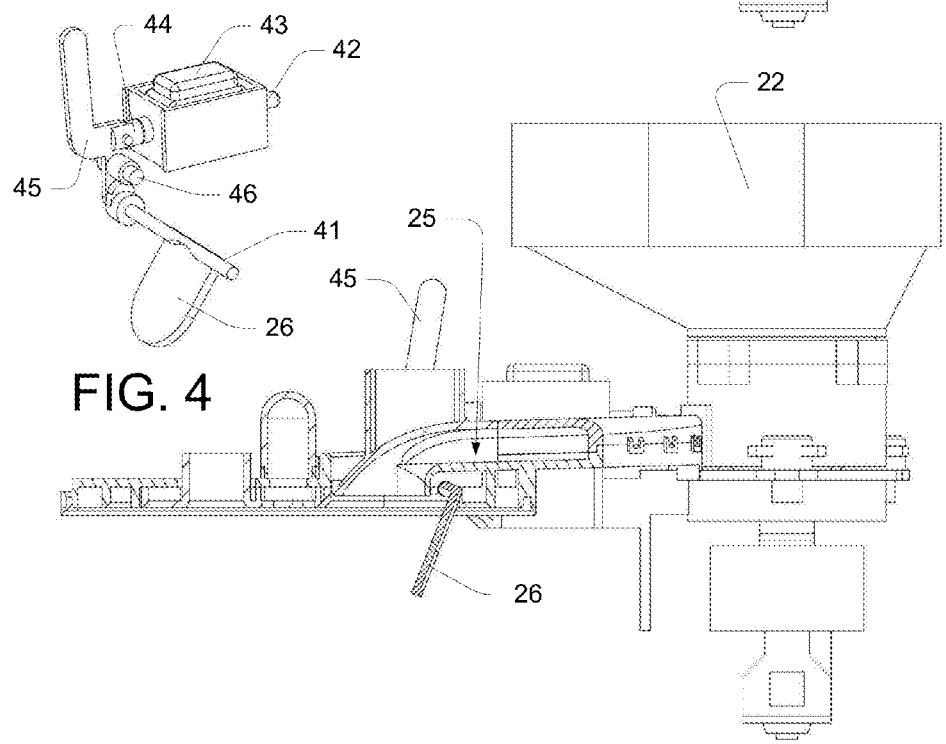
FIG. 4
FIG. 5

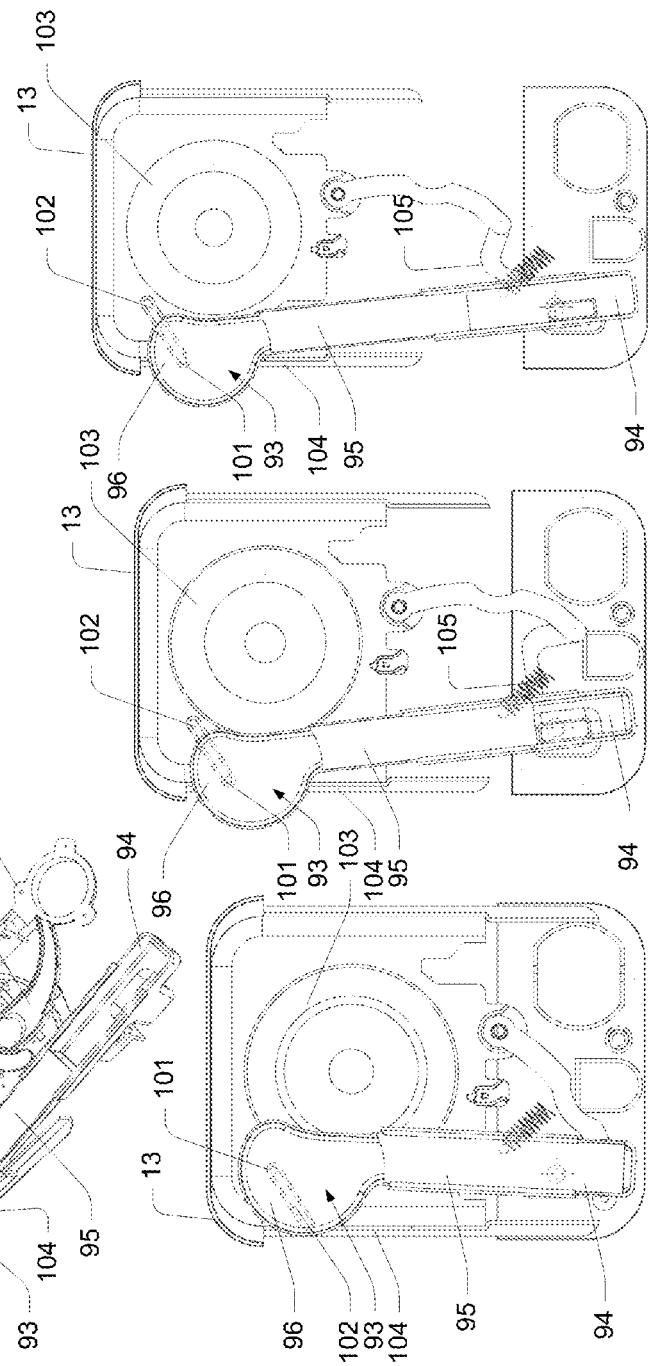

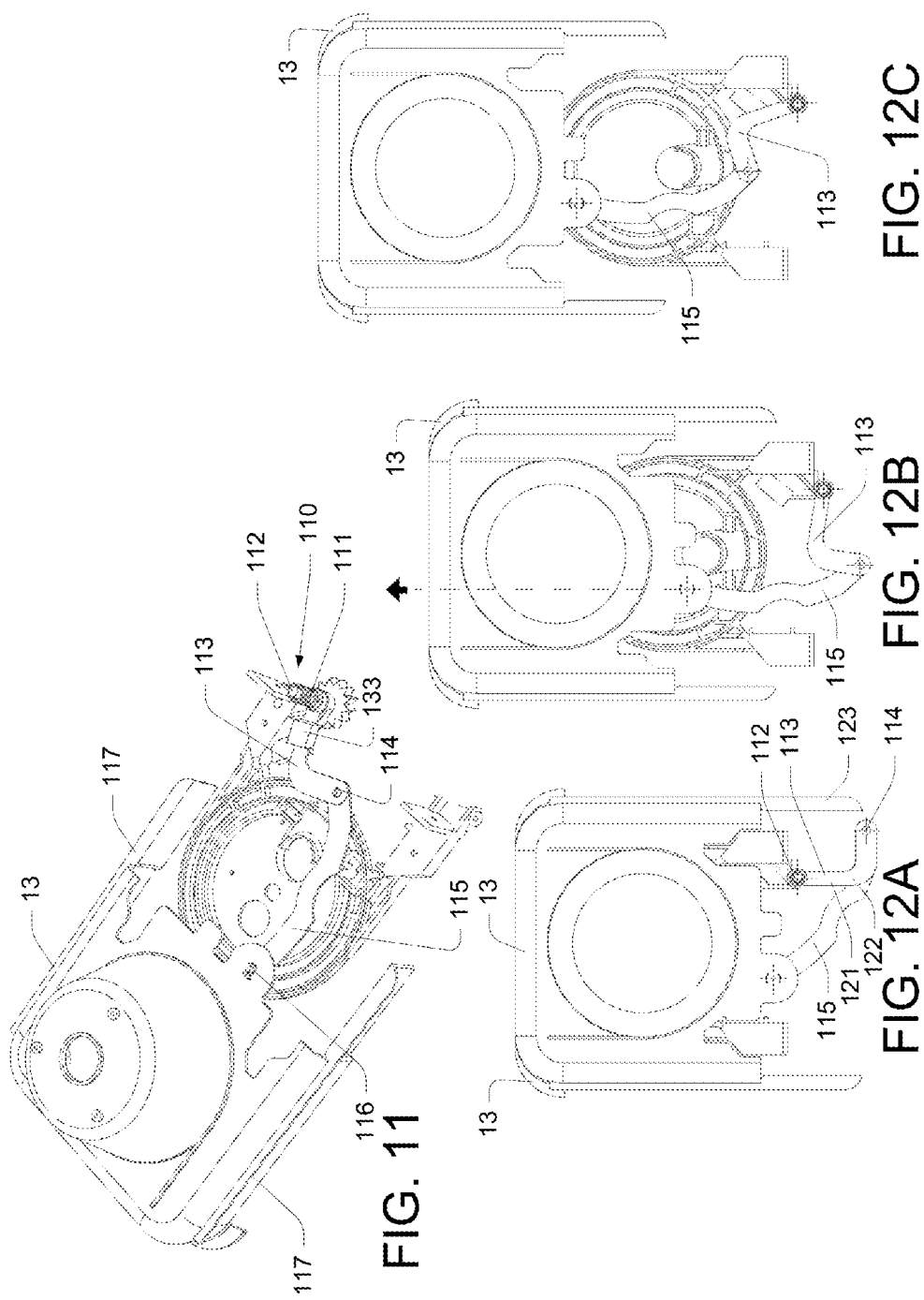

DRIP FILTER COFFEE MAKER

FIELD OF THE INVENTION

The invention pertains to coffee makers and more particularly to a drip-filter coffee maker.

BACKGROUND OF THE INVENTION

Drip-filter coffee makers are well known. However, as coffee drinkers become more sophisticated in their appreciation for better quality coffee, and coffee making equipment improvements are required to deliver better tasting coffee, ease of use and other attributes that consumers find desirable.

OBJECTS AND SUMMARY OF THE INVENTION

It is an object of the invention to provide a drip-coffee maker having an integral plate burr coffee grinder.

It is another object of the invention to provide a drip-filter coffee maker having an eject drawer that houses both the filter cone and a telescopic water fill port.

It is another object of the invention to provide a drip-filter coffee maker having an eject drawer that opens under the assistance of a spring biasing mechanism.

It is also an object to provide a carafe having a fill level indicator.

Accordingly, there is provided a drip-coffee maker comprising, a base and an upright housing that interconnects the base with a head assembly. The head assembly further comprise a filter cone and a reservoir. There is further a plate burr grinder located above the reservoir.

There is also provided a drip filter coffee maker, comprising a base, an upright housing that interconnects the base with a head assembly. The head assembly further comprises an eject tray that carries a filter cone. A reservoir is provided. There is further a spring biasing mechanism comprising a spring that ejects the eject tray outwardly.

There is further provided a carafe comprising an insulated body and a lid assembly carried by the body, and a level detection mechanism provided within the carafe.

BRIEF DESCRIPTION OF THE DRAWING FIGURES

In order that the invention be better understood, reference is now made to the following drawing figures in which:

FIG. 3 is a cross sectional view partially through the coffee delivery path showing the chute and the rotating valve;

FIG. 4 is a perspective view of the solenoid, valve link and valve;

FIG. 5 is a cross sectional view through the coffee delivery path, showing the valve in the open position;

FIG. 9 is a perspective view of the eject drawer showing the telescopic water fill port;

Figure 13:
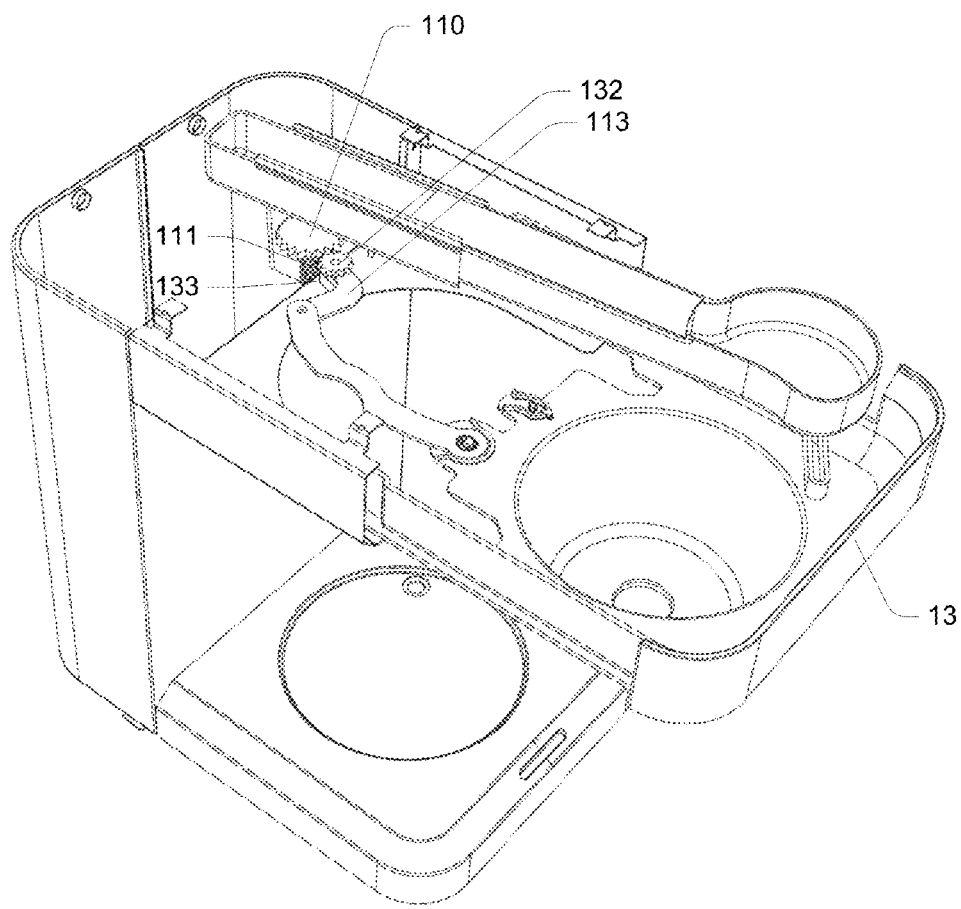
Figures 14, 15:
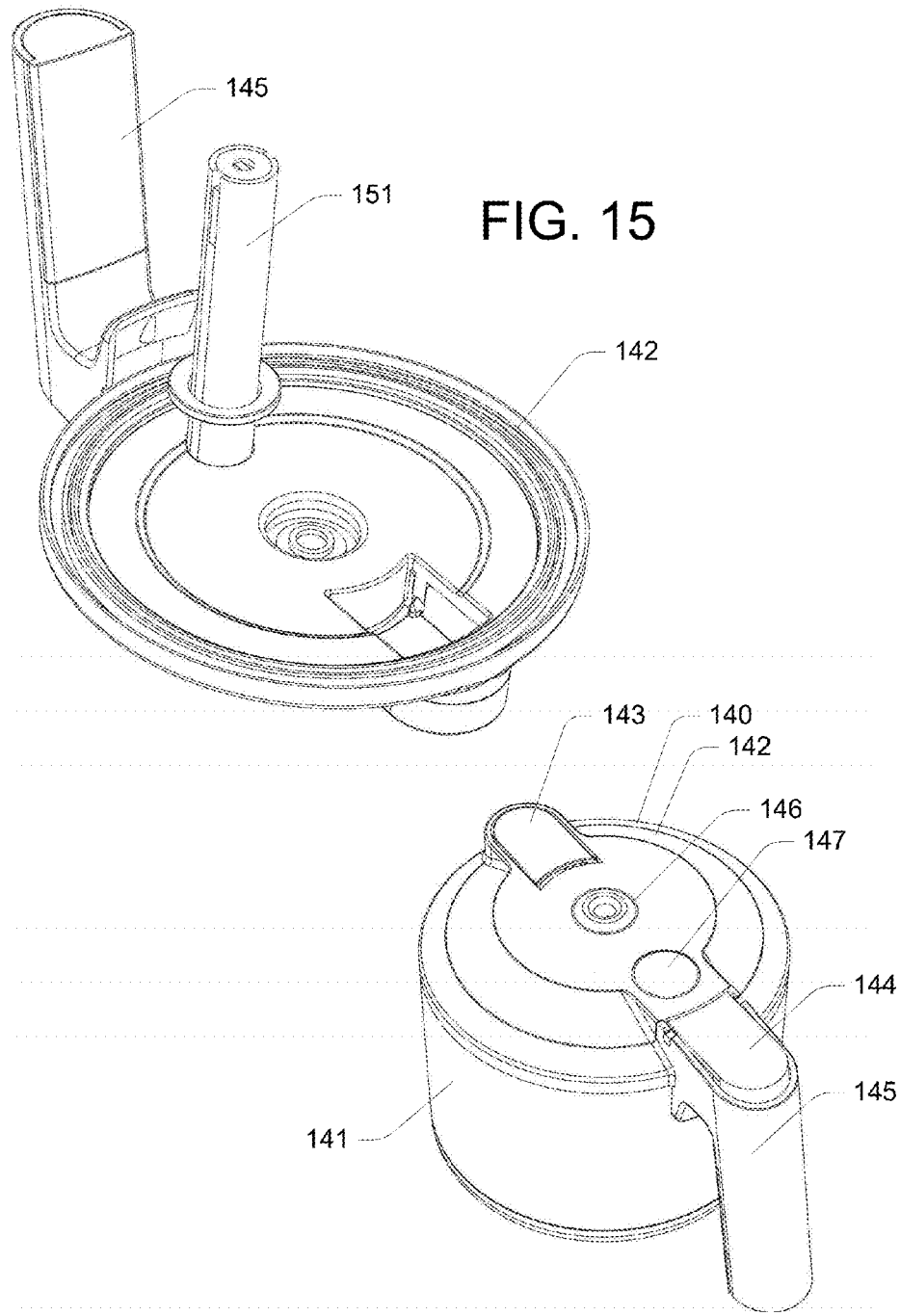
Figure 16:
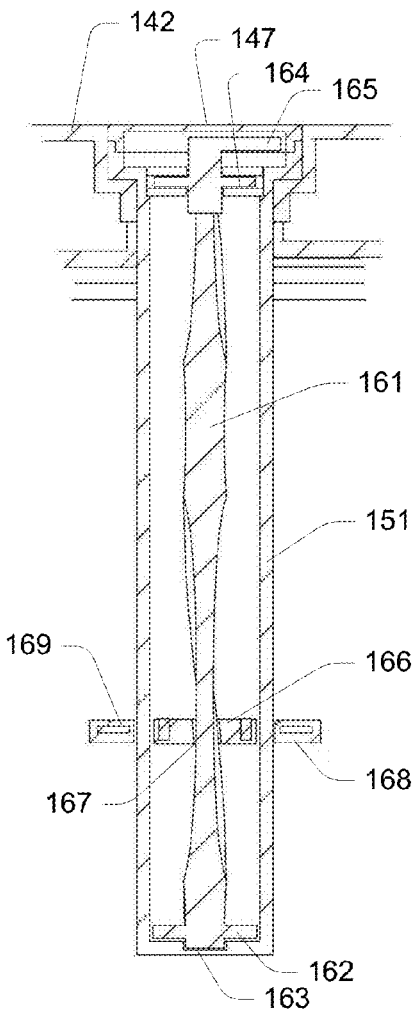
Figure 17:
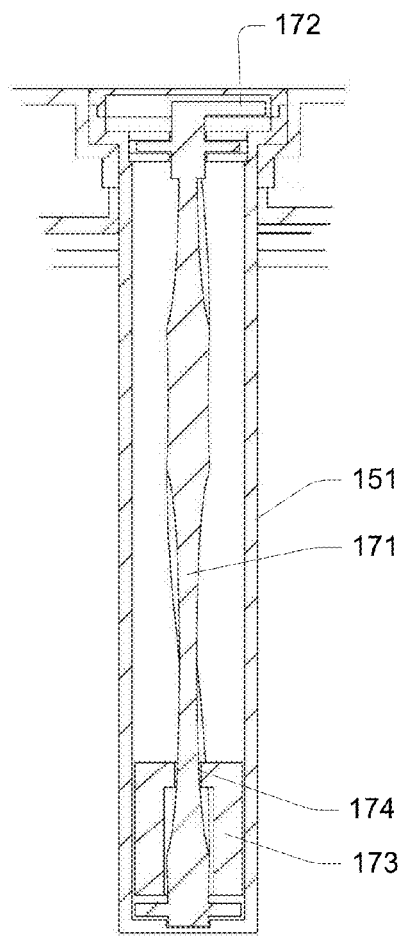
Figure 18:
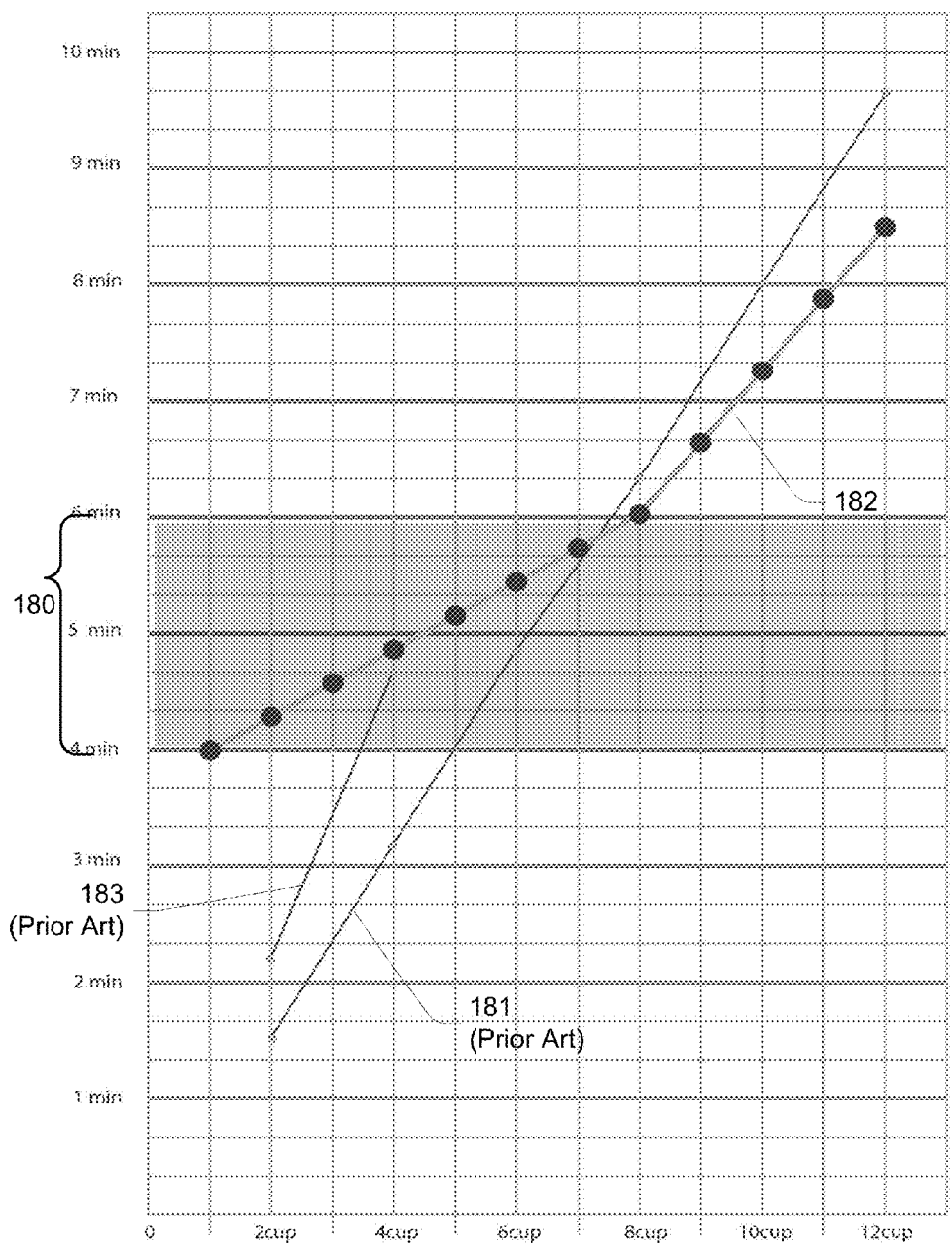
Figure 19:
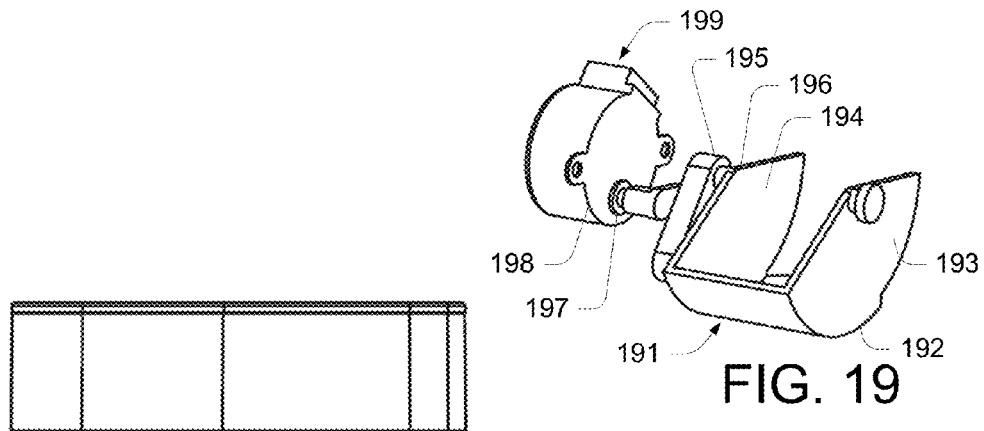
Figure 20:
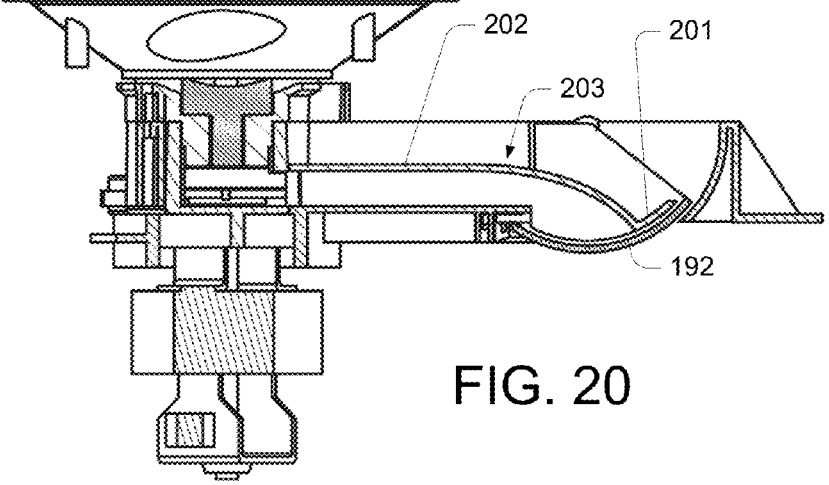
Figure 21:
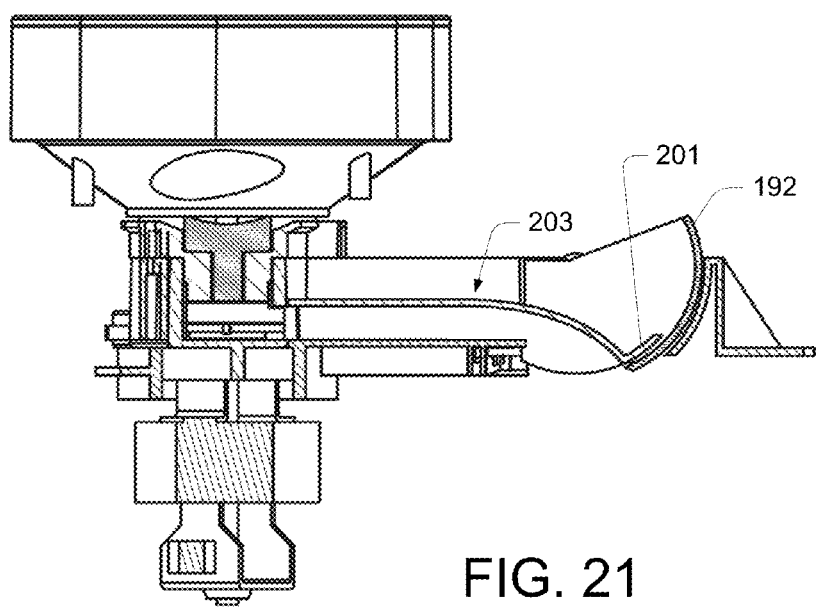
Figure 22:
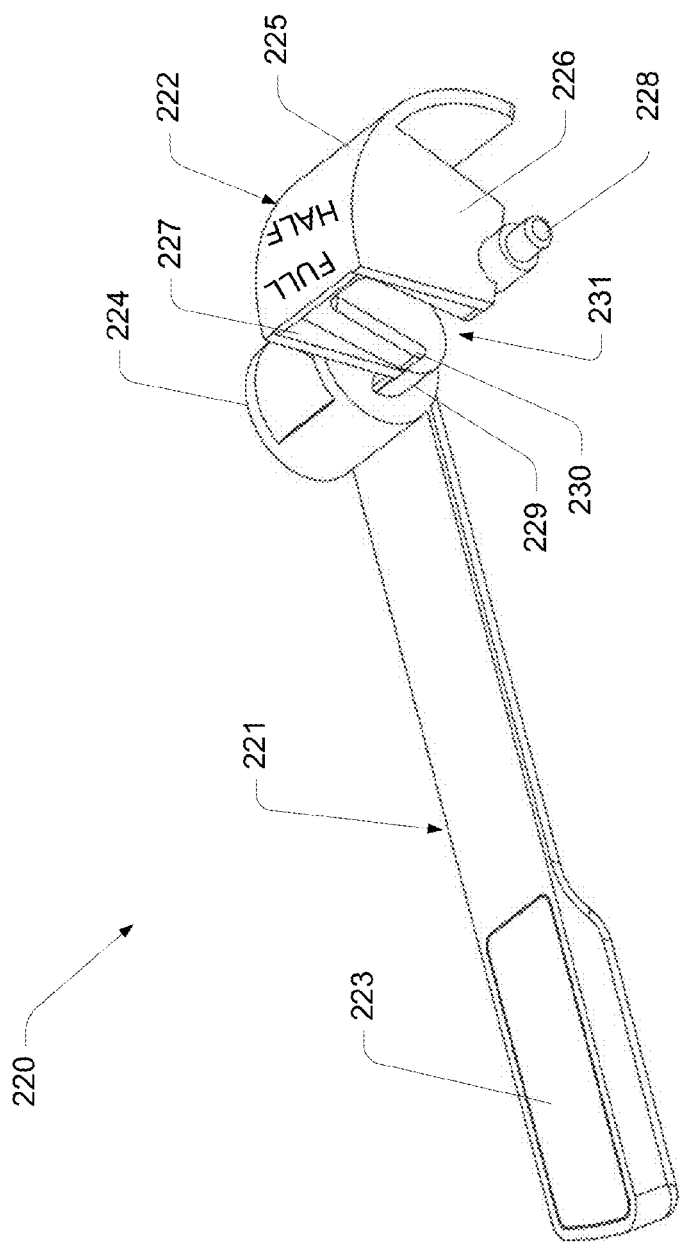
Figure 23A:
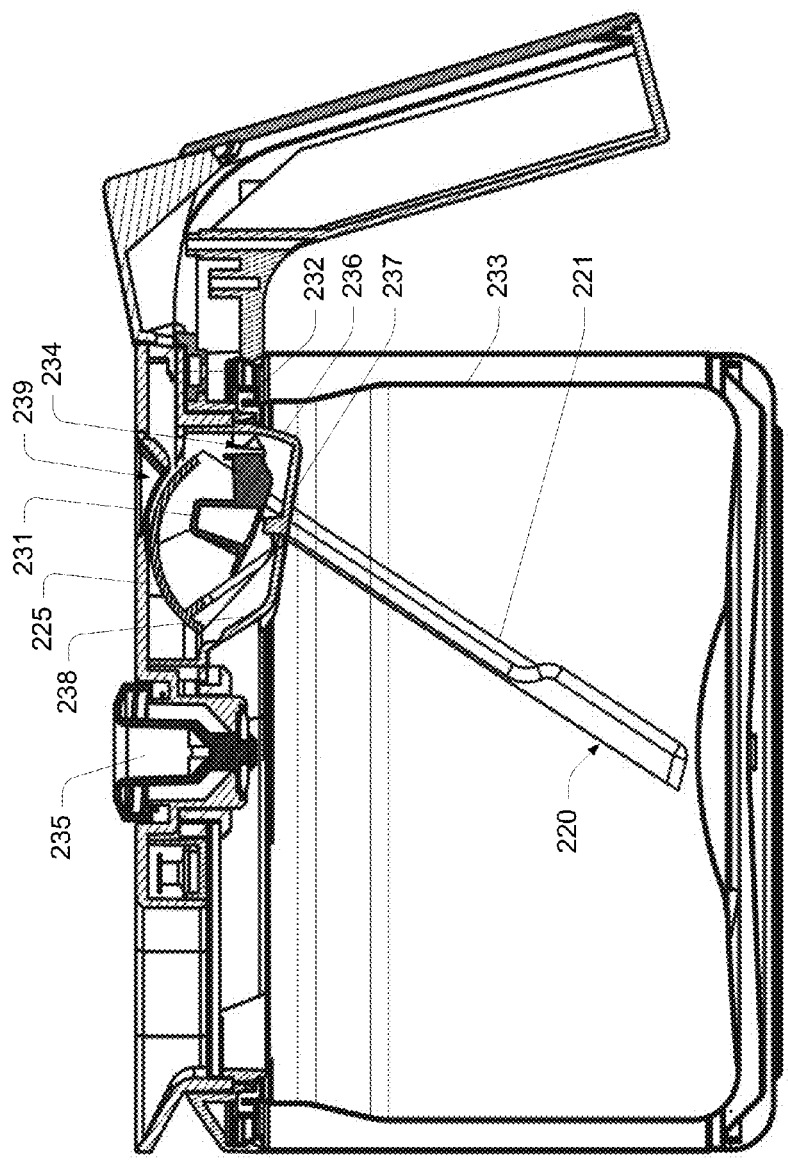
Figure 23B:
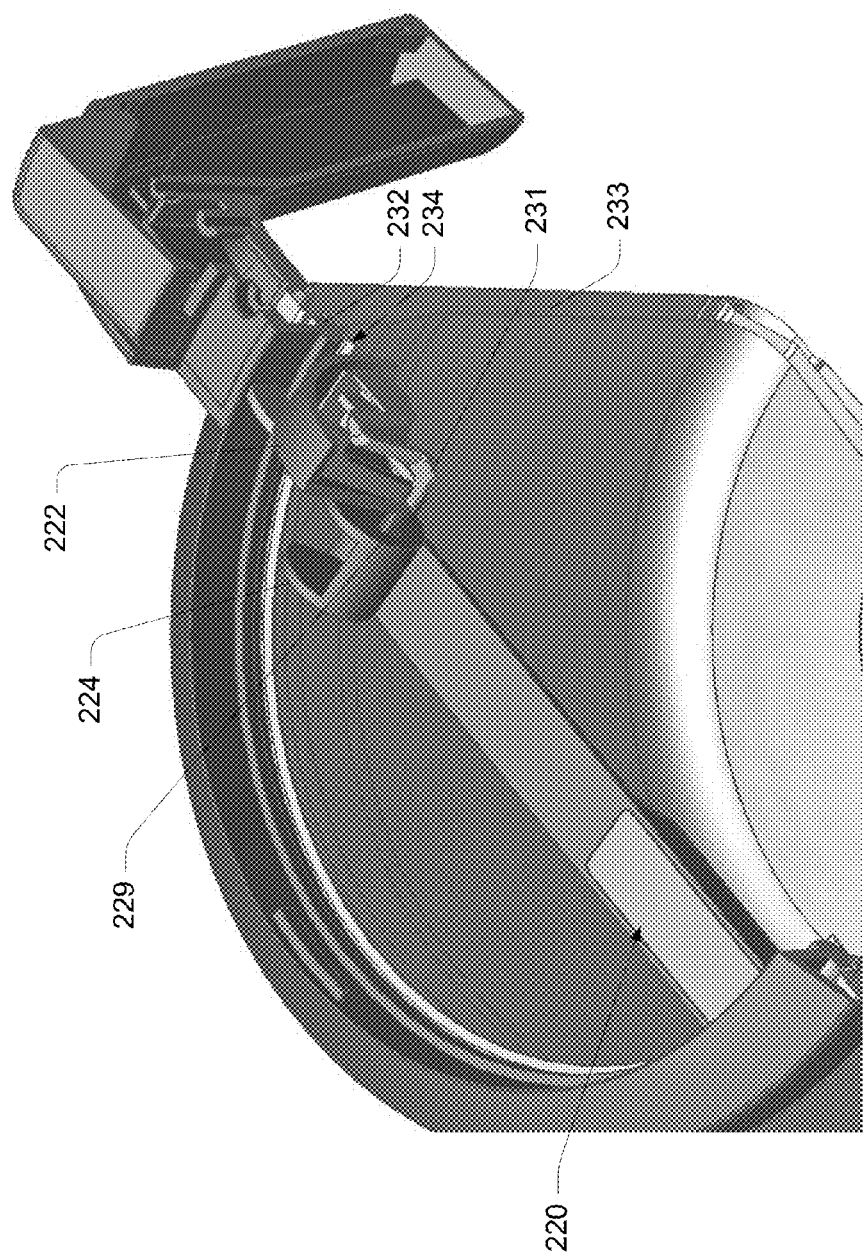
Figure 24:
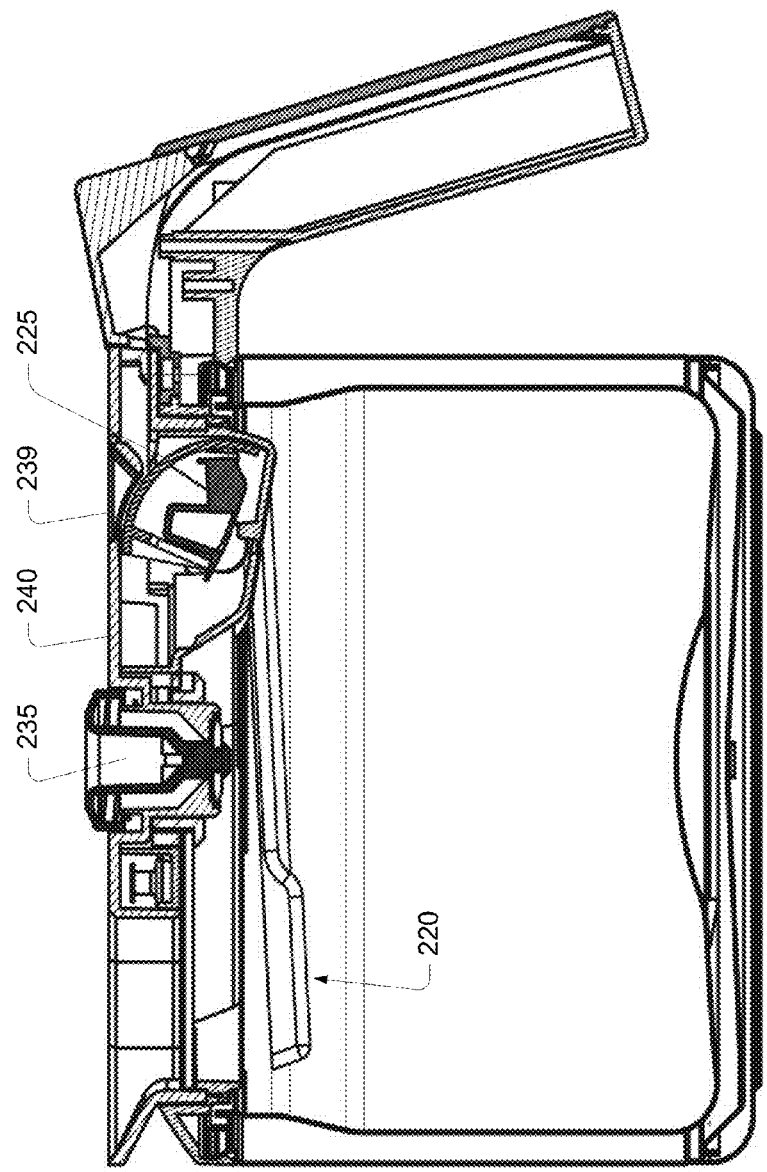

FIGS. 10(a), (b) and (c) are top plan views of the eject drawer showing the operation of the telescopic water fill port;

FIG. 11 is an inverted perspective of the eject drawer illustrating the operation of the torsion spring, damper and links;

FIGS. 12(a), (b) and (c) are inverted plan views of the eject drawer showing the operation of the drive link and slave slink;

FIG. 13 is a perspective view of the eject drawer and dampened link mechanism;

FIG. 14 is a perspective view of an insulated carafe according to the teachings of the present invention;

FIG. 15 is an inverted perspective view of the lid and level housing depicted in FIG. 14;

FIG. 16 is a cross section through a magnetic linear level indicator;

FIG. 17 is a cross section through a float linear level indicator;

FIG. 18 is a graph illustrating the way in which brew time is optimised according to sensed brew volume;

FIG. 19 is a perspective view of the coffee chute door and the DC stepping motor;

FIG. 20 is a cross sectional view partially through the coffee delivery path showing the chute door in a closed position;

FIG. 21 is a cross sectional view partially through the coffee delivery path showing the chute door in an open position;

FIG. 22 is a perspective view of a pivot float;

FIG. 23(a) is a cross sectional view of an empty carafe with the pivot float;

FIG. 23(b) is a partial perspective view of the carafe, showing the pivot float and the seat for the pivot float;

FIG. 24 is a cross section view of a filled carafe with the pivot float; and

Figure 25:
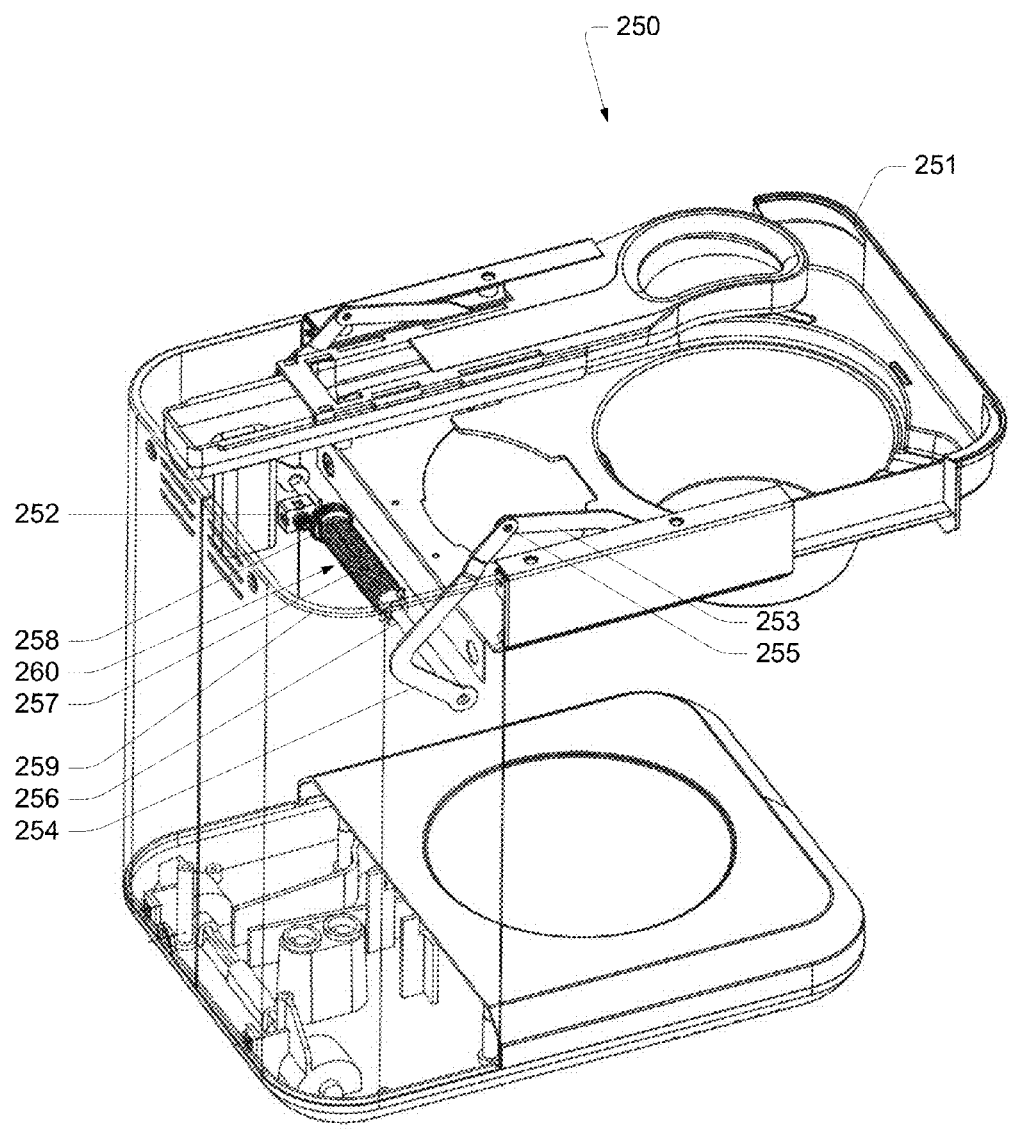

FIG. 25 is a perspective view showing the damped spring mechanism for ejecting the eject tray.

BEST MODE AND OTHER EMBODIMENTS OF THE INVENTION

Figure 1:
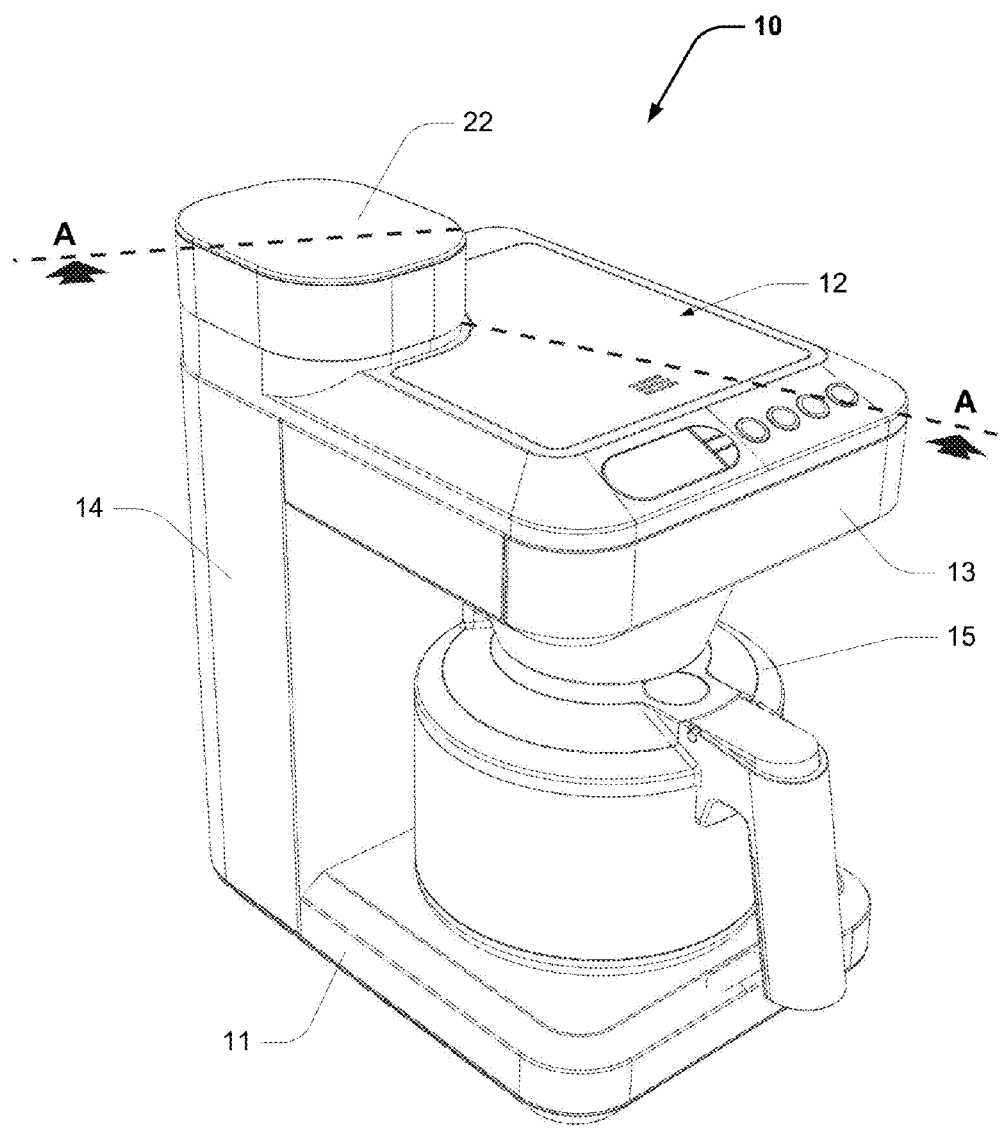
FIG. 1 is a perspective view of a drip-filter coffee maker in accordance with the teachings of the present invention.

A drip-filter coffee maker 10 is depicted in FIG. 1. The exterior appearance of the device 10 is characterised by a base 11, an upright housing 14 and a head assembly 12 with bean hopper 22 and eject drawer 13. The upright housing 14 contains a water reservoir and interconnects the base ii with the head assembly 12. In this example, the base does not include a heating plate. Instead, the unit is intended to work together with a thermally insulated carafe 15.

Figure 2:
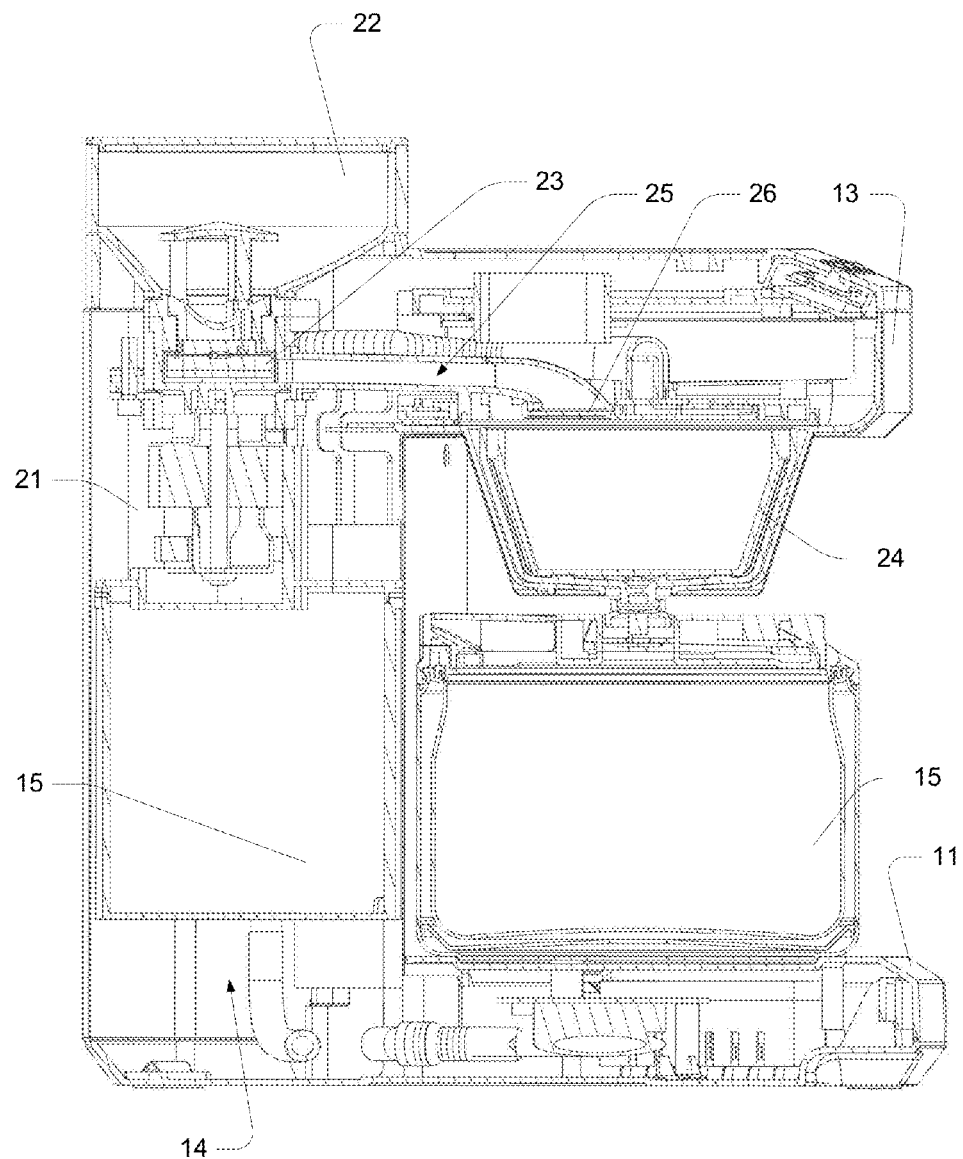
FIG. 2 is a cross section of the device depicted in FIG. 1, through line A-A.

As shown in FIG. 2, the upright housing 14 contains a water reservoir 15. Considerable space saving, particularly in the vertical direction, is achieved by locating a coffee grinder 21 above the reservoir 15, extending above the upright housing 14. The grinder's hopper 22 for coffee beans is located directly above the grinder 21.

In preferred embodiments of the invention, the grinder 21 uses plate burrs 23. A grinder with plate burrs has the property of ejecting ground coffee at higher velocities than, say, one with conical burrs. Because the kinetic energy of the ejected coffee grounds is sufficiently high with a plate burr grinder, the grinder can be located remotely from the paper filter holding cone 24. The ejected grounds travel through a coffee chute 25, being a channel that extends from the exit opening of the plate burr grinder 21, through the upright housing, into the head assembly, terminating above the filter cone, as will be further explained.

In order to prevent moisture and water vapour from entering the coffee chute 25, the chute terminates in a chute door 26. The coffee maker's controller opens the chute door 26 by activating a motor or solenoid or other actuator when grounds are being ejected by the coffee grinder 21. The chute door 26 is closed when the grinding operation is complete.

As shown in FIG. 3, the terminal bend portion 31 of the coffee chute 25 comprises a section that is removable to allow cleaning of the chute 25 as well as that area of the chute adjacent to the door 26.

As shown in FIG. 4, the rotating door 26 is mounted on a horizontal shaft 41. The reciprocating shaft 42 of a solenoid 43 has a pivot end 44 that carries a link 45. The link 45 pivots about a horizontal stub shaft 46. In this way, reciprocation of the solenoid shaft 42 causes the opening and closing of the door 26. As shown in FIG. 5, when the door 26 is open, coffee grounds ejected by the plate burr grinder are delivered into the open mouth of the brew cone 24. When the door 26 is closed, the coffee chute 25 is effectively sealed from the area of the brew cone. An alternative mechanism for closing the door is depicted in FIGS. 19 to 21.

Figure 6:
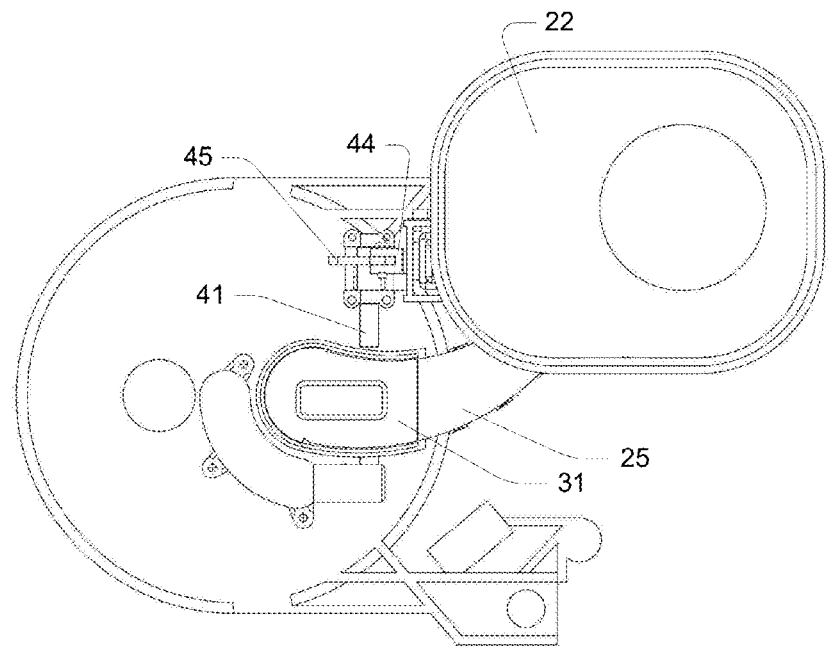
FIG. 6 is a top plan view of the hopper and coffee delivery path.
Figure 7:
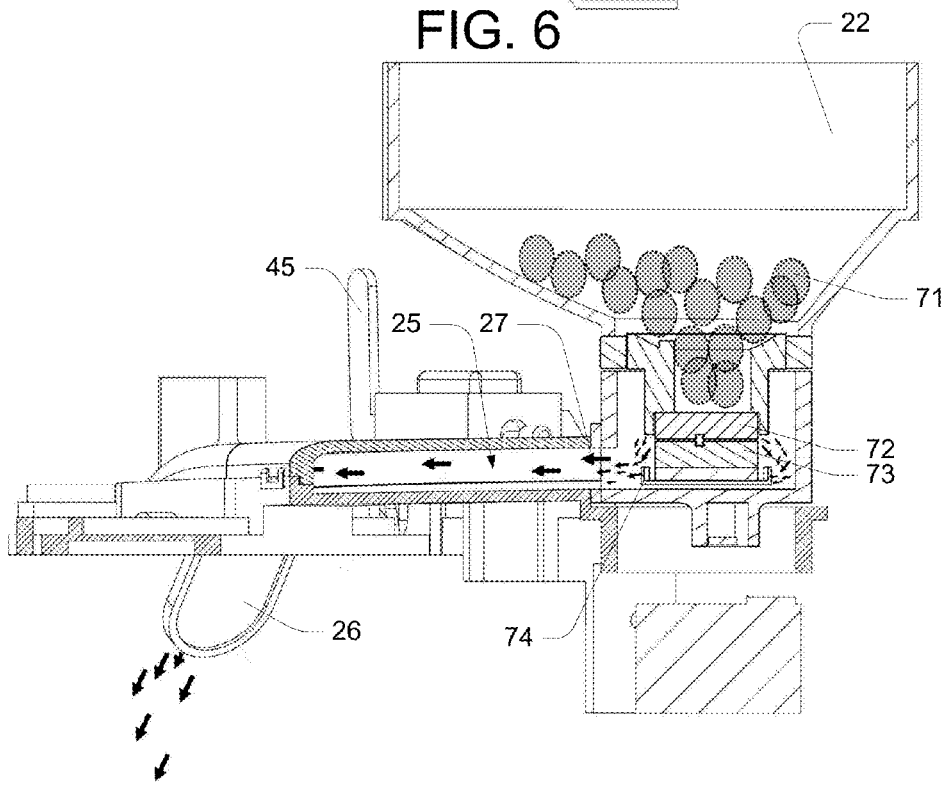
FIG. 7 is a cross section through the plate burr grinder and coffee chute.

As shown in FIG. 6 the coffee chute 25 comprises an enclosed channel that follows a slightly curved path from the exit opening of the grinder to the area of the valve 26. The path of the chute 25 is slightly curved to conserve the kinetic energy of the ejected coffee grounds. In particularly preferred embodiments, the coffee chute approximates the exit trajectory of the ground coffee. As best shown in FIG. 7, whole beans 71 are contained within the hopper 22. The beans descend into the area of the plate grinding heads 72, 73, it being understood that the upper plate burr 72 has a central opening for allowing the beans to pass therethrough. Coffee grounds are ejected through the gap that exists between the upper lower burrs 72, 73. A stainless steel fan 74 that rotates with the grinder motor assists with the propulsion of the grounds through the exit opening 75 of the grinder.

Grounds passing through the exit opening 75 travel through the curved chute 25 which is also disposed slightly "downhill" from the burrs, allowing gravity to assist in the delivery of the grounds from the exit opening 75 to the area of the chute door 26. The duration of operation of the grinder determines the amount of grounds supplied to the brew cone. This duration can be established with reference to fill level (volume) data provided by the sensors in the reservoir 81.

Figure 8:
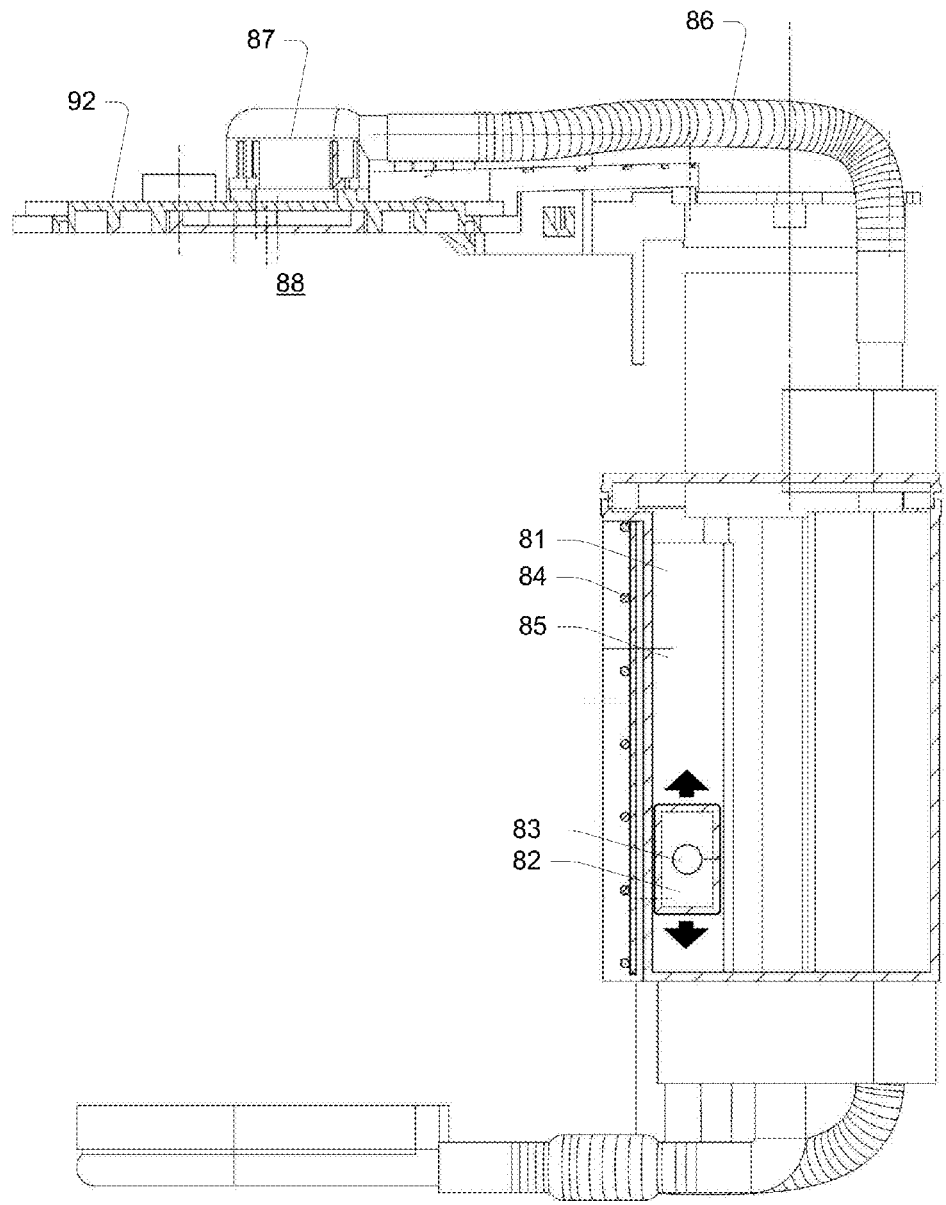
FIG. 8 is a side elevation, partially cross sectioned, of the water tank, volume sensors and water delivery system.

As shown in FIG. 8, the internal reservoir 81 comprises a water tank in which may be located a float 82 or other level detection sensor. The float 82 incorporates, for example, a magnet 83 that can be detected by a number of evenly spaced and vertically arranged proximity sensors 84. In preferred embodiments, the proximity sensors are spaced apart so that each switch corresponds to e.g. two cups of water. Adding water to the reservoir causes the float and thus the magnet 83 to rise in the float guide chamber 85. The device's controller detects which one or two of the proximity sensors 84 are in closest proximity to the magnet 83. Thus, the controller can determine the volume in the reservoir to a resolution of approximately one cup. This data, collected about the volume of water in the reservoir, can be used for a number of purposes. One purpose is to adjust the quantity of coffee beans that are ground and discharged by the grinder. This is done by having the device's controller establish an "on" time for the grinder that is based on the amount of water in the reservoir. Another purpose for the sensors is to adjust the duration of the discharge of hot water or brew time, as will be further explained. Note that the contents of the reservoir are discharged through a flexible hose 86 that has an outlet 87 located above the open mouth of the brew cone 88.

As shown in FIG. 9, the grinder housing 91, coffee chute 25 (shown partially disassembled) and the cap 92 that covers the brew cone remain stationery while the eject tray 13 is able to open and close. In this example, these components are moulded together to form a showerhead chassis 97. As suggested by FIGS. 9 and 10 (*a*)-(*c*), the opening and closing of the eject drawer 13 causes the deployment of a telescopic water fill port 93. The port 93 comprises a pivoting open-top tail piece 94 and a reciprocating water chute 95 nested within it. As depicted in FIG. 10 (*a*), when the eject tray 13 is closed, the water port 93 is fully contained within the head assembly. The water chute 93 terminates in an open topped funnel-like tray or enlargement 96. The underside of the funnel-like enlargement 96 features a vertical pin 101 that is captured by and travels within a slot 102 formed into the bottom surface of the eject drawer 13. As shown in FIG. 10 (*b*) opening the eject drawer 13 causes the telescopic chute 95 to extend from the tail piece 94. Simultaneously, the action of the pin 101 in the slot 102 causes the entire port 93 to pivot away from the brew cone 103. A gap 104 along the side edge of the eject tray 13 allows the enlarged funnel-like terminus of the port to extend past the side edge the eject tray 13 making it easily accessible to a user. As shown in FIG. 10 (*c*) when the eject tray 13 is fully open, the port 93 is both fully extended and fully laterally displaced, thus fully clearing the outer margin of the brew cone 103. In this position, paper filters can be introduced into or removed from the brew cone 103 without being obstructed by the port 93. A tension spring 105 biases the fill port 93 toward its initial position shown in FIG. 10 (*a*) thus facilitating the retraction of the port 93 as the eject tray 13 is closed.

As shown in FIGS. 11 and 12 (*a*)-(*c*), the opening of the eject drawer 13 is facilitated by an optional dampened spring mechanism. As shown in FIG. 11, a torsion spring assembly no is fixed within the head assembly or vertical housing. Thus, a torsional spring 111 is carried around a fixed shaft 112. The shaft 112 also carries a pivoting drive link 113 that is biased toward an extended position by the torsion spring 111. For the sake of compactness, the drive link 113 is generally "L" shaped. The outer terminal end 114 of the drive link 113 is pivoted to a slave link 115 that responds to the rotating extension of the drive link 113. The outer terminal end of the slave link 115 is pivoted to a portion of the eject tray 116.

The eject drawer 13 is maintained in a fully closed position by a latch mechanism. Pushing the eject tray 13 inward, toward the vertical housing releases the latch mechanism and allows the torsional spring to rotate the drive link 113 toward its extended position. In doing so, the slave link 115 urges the eject tray 13 toward its fully extended position. This reciprocating motion of the eject tray 13 is guided by rails 117 located along the lateral extremities of the eject drawer 13. The parallel rails 117 are carried by cooperating slots formed in the head assembly.

The geometry of the above referenced link mechanism is better explained with reference to FIGS. 12 (*a*)-(*c*). The eject tray 13 is shown in its closed position in FIG. 12 (*a*). Note that the "L" shaped drive link 113 extends rearward from its pivoting connection with the shaft 112 and torsional spring 111. Thus, a first arm 121 of the drive link 113 extends rearward from the shaft 112, and makes a 90° bend 122. The drive link 113 continues through the bend 122 toward the nearest lateral edge of the drawer 123 and terminates at its pivoting connection 114 with the slave link 115.

With reference to FIG. 12 (*b*) it will be appreciated that the drive link 113 is being rotated clockwise (as seen from below) and toward the brew cone, thus causing an extension of the slave link 115. In the fully extended position, as shown in FIG. 12 (*c*) the drive link 113 and the slave link 115 are both fully extended, causing a full extension of the eject tray 13. As suggested by FIG. 11, the torsional spring mechanism 121 has its pivoting connection with the drive link 113 occurring at a vertical height that results in both a drive link and slave link running just above the underside 122 of the eject drawer 13.

As suggested by FIG. 13, the motion of the eject tray 13 caused by the torsional spring assembly 121 is dampened so as to moderate both the velocity and acceleration that would otherwise be imparted by the torsional spring. This is achieved by locating a fixed gear 131, for example moulded into the underside of the showerhead chassis 97. A rotating gear 132 is located on and above the drive link 113. The fixed gear 131 and the damper's rotating gear 132 cooperate by meshing with one another. As the drive link 113 rotates about the shaft 112 of the torsional spring assembly 110 the rotation of the damper's gear 132 is resisted by a damping mechanism 133 located on an underside of the drive link 113, directly below and in communication with the rotating gear 132. Dampening mechanisms of this kind are characterised by frictional mechanisms such as an arrangement of a rotating impeller carried within a grease containing compartment. Other dampening mechanisms may be used to the same effect. An example is depicted in FIG. 25.

As shown in FIG. 14 it is preferred that the drip-filter coffee maker of the present invention be used with reference to a thermally insulated carafe 140. The carafe 140 comprises a thermally insulated, opaque body 141 that carries, by hinged or screwed connection, a removable thermally insulating lid assembly 142 with a handle 145. The lid is removable and replaceable for convenience of cleaning. The lid preferably features a pivoting spout cover 143 that is activated by a thumb trigger 144 carried above the handle 145. The spout cover 143 and thumb trigger 144 are interconnected by a mechanical linkage carried within the lid 142. The lid 142 also features a central opening 146 into which brewed coffee is discharged. The lid 142 also features a clear display lens 147 through which the volume of brewed coffee within the carafe can be viewed, as will be explained.

As shown in FIG. 15, a tubular indicator housing 151 is carried by the underside of the lid 142. Note that the handle 145 is also attached to and carried by the lid 142. The combination of site glass and indicator tube 151 may be used in a variety of ways as explained below.

As shown in FIG. 16, the indicator tube 151 is carried within an opening in the lid 142. In this embodiment, the tube 151 is sealed. Contained within it there is a helical, rotating indicator shaft 161. The indicator shaft 161 has a flange 162 at is lower end that works in conjunction with a stub or pin 163 to locate and journal the lower end of the shaft 161 with respect to the lower end of the tube 151. The upper end of the shaft 161 also carries a flange 164. A pointer 165 is carried, preferably above the upper flange 164 and below the site glass 147. A magnetic ring 166 having a central slot 167 is carried around the indicator shaft 161. The magnetic ring 166 is keyed with respect to the interior of the tube 151 so that it is prevented from rotating while being allowed to freely move in the vertical direction. In this way, the rising and falling of the magnetic disk 166 causes a corresponding rotation in the indicator shaft 161. This vertical movement of the magnetic ring 166 is caused by the movement of a float disk 168. Although the float disk 168 is buoyant, it contains an element such as a steel disk 169 that has a magnetic interaction with the magnetic ring 166. Thus, the magnetic ring 166 will follow the motion of the float disk 168, causing a corresponding rotation in the indicator shaft 161. The pointer 165, being rigidly carried by the shaft 161 indicates the degree of rotation and thus the volume of water or brewed coffee within the carafe.

An alternate embodiment is depicted in FIG. 17. In this embodiment, the indicator tube 151 is not sealed and therefore, brewed coffee within the carafe is able to enter the interior of the tube 151. A similarly configured indicator shaft 171 and pointer 172 are contained within the tube 151. As coffee enters the interior of the tube 151 it causes a float 173 to rise or fall. The float 173 is keyed to the interior of the tube 151 so that the float's central slot 174 acts on the helical shaft 171 to rotate it. In this way, the movement of the float 173 is translated into a rotation of the pointer 172 and provides the user with an indication of the internal volume of coffee contained within the carafe.

As previously mentioned, the device's controller receives information from the tank volume sensors 84 previously discussed with reference to FIG. 8. Because the entire volume of the tank 81 is delivered into the ground coffee in the brew cone, the volume within the tank 81 at or just before the inception of the brew cycle is directly indicative of the brew volume. The unit's controller can use this pre-established measurement of brew volume to adjust the brew time for the purpose of delivering an optimised brew. In one embodiment, the brew time is adjusted by on and off cycling of the unit's boiler. This on and off cycling of the boiler can be used to slow down the effective rate at which the boiler delivers water to the grounds in the filter. As shown in FIG. 18, it can be seen that a conventional optimised brew time 180 corresponds to an interval of four-six minutes. This means that hot water is in contact with the grounds in the filter for about four to six minutes. A first line 181 on the graph of FIG. 18 illustrates the volumetric output of a conventional drip-filter coffee maker over a period of time. It can be seen that the output is essentially linear ranging from 1.5 minutes for a two cup brew through to about 11 minutes for a 12 cup brew. However, note that the brew is only within the optimised range 180 from about five cups through to about seven cups. When less than five cups are brewed, the brew cycle is essentially too short. The present invention overcomes this by adjusting the brew cycle time in accordance with the teachings above by adjusting the brew cycle time in accordance with the predetermined volume measurement taken from the reservoir prior to the inception of the brew cycle. In this example, it can be seen that when a single cup is brewed, as determined by the sensors 84, the brew cycle is adjusted to four minutes. With reference to the example of a four cup brew, the brew cycle time is adjusted to just short of five minutes, well within the optimised zone 180. Because the brew cycle time can be adjusted downwardly in the manner suggested, it allows the unit to benefit from a more powerful heater, thus providing faster delivery of brewed coffee. This faster delivery of brewed coffee provides an advantage when the brew volume is about eight cups (or more) when compared to the prior art brew times 181.

It can also be seen that some prior art devices have a small cup setting 183 in which the delivery pump is run at a slower rate. This has the effect of retarding the brew cycle time and provides better quality when the brew volume is between two and four cups. However, even with the "small cup setting" associated with prior art devices, (a) brews fail to reach the optimum brew cycle time 180 when the brew volume falls below about 3.5 cups, and (b) the "small cup setting" has no bearing on brew volumes in excess of about 4 cups.

FIGS. 19, 20, and 21 depict a further embodiment where, instead of a solenoid, a DC stepping motor is used to control the chute door (or "chute valve") at the end of the coffee chute. Referring to FIG. 19, the chute door 191 in this example comprises an arched floor 192 that extends between two generally fan-shaped side panels 193, 194. A slot 195 is rigidly attached to the fan-shape 194 between the fan-tip 196 and a location closer to the floor 192. In some embodiments, the slot and the fan-shape are integrally formed. The slot 195 is located adjacent to a DC stepping motor 199. The stepping motor has an output driving shaft 198. A crank 197 is mounted on the driving shaft 198, and further carries a pin (not shown) that rides in the slot 195. Rotation of the motor is thus translated into a reciprocating motion in the chute door.

Referring to FIGS. 20 and 21, a lip 201 extends from the upper roof 202 of the chute 203. This hp 201 is similarly curved as the chute door floor 192 and is located just above the chute door floor 192. When the stepping motor is in the 'closed' position, the floor 192 closes the chute 203. Referring to FIG. 21, as the stepping motor 'steps into' the 'open' position, the motor's driving shaft rotates and turns the crank, the slot, and the chute door. The chute door floor 192 then rotates toward the lip and unblocks the chute.

In some embodiments, the carafe (because it is opaque) further includes a level detection mechanism that allows the user to see the liquid level within the opaque carafe. In one example, a pivot float is used for this purpose. Referring to FIG. 22, the pivot float 220 has a floating arm 221 and an indicator 222. A pocket, such as an air pocket 223 is provided on one end of the floating arm 221. In this embodiment, the air pocket is ultrasonically sealed into the injection moulded floating arm. A roller 224 that approximately cylindrical in profile is provided on the other end of the arm 221. The indicator is located beside and rigidly affixed to the roller 224.

The indicator 222 further has an arc-shaped scale 225 that has markings or wordings to show the liquid level in the carafe. Two side panels 226, 227 project perpendicularly from the scale 225. An inverted "U" shaped third panel 230 is further provided between the two side panels. The scale 225 and the side and third panels define a space 231 into which retaining details from the carafe are locatable. There are two aligned stub axles 228, 229, each extending perpendicularly out of one panel. The axle 229 extending from the panel 227 adjacent to the roller 224 is rigidly affixed into the roller 224. The other axle extends into a corresponding detail (not shown) provided in the carafe and helps locate the pivot float 220.

As shown in FIGS. 23 (*a*) (*b*) and 24, a seat 231 is attached to the rim 232 of the carafe sidewall 233. This attachment is provided such that a gap 234 wide enough to accommodate the scale 225 and one thickness of a rotation limiter is provided between the rim 232 and the seat 231. The seat 231 is locatable within the space defined by the panels and scale 225 of the indicator. The pivot float 220 can thus be positioned for rotating motion on the seat. From the seat 231, the floating arm 221 can extend toward the interior of the jug.

The rotation limiter extends from the sidewall of the central coffee inlet 235 and toward the jug sidewall where the seat 231 is attached. The limiter cradles the seat 231 from below the indicator. A first portion 236 of the limiter is locatable in the gap 234 between the rim 232 and the seat 231. The first limiter portion 236 bends into a second portion 237 that lies below the indicator. The second limiter portion 237 inclines towards and bends into a third limiter portion 238.

Further, a view window 239 with optional viewing lens is provided in the lid 240 and is located above the scale 225. This view window may be a view opening with or without a lens that covers or seals the opening. As the floating arm rises up and down with changes in the liquid level, the pivot float pivots about its axel (not shown) and causes the scale 225 to rotate. Different portions of the scale bearing different markings become visible through this view window. The revealed marking indicates to the user what the fill level within the carafe is.

In further embodiments, the dampening of the eject tray motion may be achieved in a fashion modified from the mechanism depicted in FIG. 13. Referring to FIG. 25, the eject tray 251 of the coffee maker 250 is biased outwardly by a dampened spring mechanism. A torsion spring 257 is wound around a shaft 256. Each terminal end of the shaft is attached to a generally L-shaped drive link 254. When the eject tray is closed, each drive link 254 extends rearward and upwardly until it bends into an elbow. After this point the drive link extends upwardly but forwardly, and ends at a pivoting connection 255 with a slave link 253. From this pivoting connection, the slave link 253 reaches forwardly and downwardly, until its attachment to a lateral side 260 of the eject tray 251. Each drive link and its corresponding slave link are collectively referred to as a linkage assembly. The linkage assemblies on both ends of the shaft are parallel and identical to each other. All of the aforesaid pivot connections rotate about horizontal axes that are parallel to the front and rear edges of the eject tray.

As the latch mechanism (not shown) is released, the torsion spring is also released. The spring bias causes the shaft and the drive links to rotate forwardly. The rotation of the drive links pushes both the pivoting connection and consequently the slave links toward the front, ejecting the tray.

Further referring to FIG. 25, the dampening of this spring biased eject motion is achieved by mounting a rotating gear 258 to the shaft, and meshing the rotating gear with a damper's gear 259 that is in communication with a damping mechanism 252. The spring biases the shaft to rotate forward, but this forward rotation is moderated, or dampened, by the damper's gear.

While the present invention has been disclosed with reference to particular details of construction, these should be understood as having been provided by way of example and not as limitations to the scope or spirit of the invention.

What is claimed is:
1. A drip filter coffee maker device, includes:
    a base;
    an upright housing that interconnects the base with a head assembly; the head assembly further comprising a removable brew cone;
    a reservoir comprises a water tank having a level detection sensor;
    a control module coupled to the level detection sensor for determine the volume of water in the water tank;
    a burr grinder; the burr grinder adapted to discharge ground coffee into a coffee chute; a coffee chute extending from an exit of the burr grinder to a chute door located about the brew cone for discharging ground coffee into the brew cone;
    a water outlet located about the brew cone for discharging water into the brew cone;
    the control module receives data indicative of water volume in the reservoir, and adjust the quantity of coffee beans that are ground and discharged by the burr grinder; and
    the controller module calculates an "on" time for the burr grinder that is based on the amount of water volume in the reservoir; and
    the controller module calculates a brew time based on the estimate of ground coffee discharged to the brew cone; and the controller module calculates an effective hot water discharge rate for delivering the water volume in the reservoir over the calculated brew time,
wherein the water discharge rate is controlled by on and off cycling of a water boiler.

2. The device according to claim 1, wherein a duration of operation of the burr grinder is calculated with reference to a fill level volume data provided by the level detection sensor, and this duration determines the amount of grounds supplied to the brew cone.

3. The device according to claim 1, further comprising a chute door for selectively closing the coffee chute.

4. The device according to claim 3, wherein the coffee chute comprises an enclosed channel that follows a slightly curved path from the exit opening of the burr grinder.

5. The device according to claim 4, wherein the curved path of the coffee chute substantially conforms to the exit trajectory of the ground coffee from the burr grinder to thereby conserve the kinetic energy of the ejected coffee grounds.

6. The device according to claim 5, wherein the a chute door is mechanically coupled to a direct current motor for both selectively opening and closing the chute door; the chute door being open operation of the burr grinder.

7. The device according to claim 1, wherein the level detection sensor includes a float having a magnet that can be detected by a plurality of proximity sensors.

8. The device according to claim 7, the proximity sensors are spaced apart so that detection at successive proximity sensors corresponds to two cups of water.

9. The device according to claim 7, wherein the proximity sensors are vertically spaced apart along a corresponding a float guide chamber that contains the float.

10. A drip filter coffee maker device, includes:
a base;
an upright housing that interconnects the base with a head assembly; the head assembly further comprising a removable brew cone;
a reservoir comprises a water tank having a level detection sensor;
a control module coupled to the level detection sensor for determine the volume of water in the water tank;
a burr grinder; the burr grinder adapted to discharge ground coffee into a coffee chute; the coffee chute extending from an exit of the burr grinder to a chute door located about the brew cone for discharging ground coffee into the brew cone;
a water outlet located about the brew cone for discharging water into the brew cone;
wherein the control module receives data indicative of water volume in the reservoir, and adjust the quantity of coffee beans that are ground and discharged by the burr grinder;
the controller module calculates an "on" time duration for the burr grinder that is based on the water volume in the reservoir; the "on" time duration is calculated with reference to a fill level volume data provided by the level detection sensor, and this duration determines an estimated amount of grounds supplied to the brew cone; and
the controller module calculates a brew time based on the estimated amount of ground coffee discharged to the brew cone; and
the controller module calculates a hot water discharge rate to deliver the water volume in the reservoir over the calculated brew time; the water discharge rate being controlled by on and off cycling of a water boiler.

* * * * *